(12) United States Patent
Hara et al.

(10) Patent No.: US 11,204,507 B2
(45) Date of Patent: Dec. 21, 2021

(54) POSITIONING MEMBER HAVING CUTOUT PORTION AND POLARIZATION BEAM COMBINING MODULE USING POSITIONING MEMBER

(71) Applicant: Sumitomo Osaka Cement Co., Ltd., Tokyo (JP)

(72) Inventors: Tokutaka Hara, Tokyo (JP); Kei Katou, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 238 days.

(21) Appl. No.: 16/364,457

(22) Filed: Mar. 26, 2019

(65) Prior Publication Data

US 2019/0302471 A1    Oct. 3, 2019

(30) Foreign Application Priority Data

Mar. 30, 2018   (JP) .............................. JP2018-066560

(51) Int. Cl.
*G02B 5/30* (2006.01)
*G02B 27/28* (2006.01)
*G02B 6/27* (2006.01)

(52) U.S. Cl.
CPC .......... *G02B 27/283* (2013.01); *G02B 5/3083* (2013.01); *G02B 6/272* (2013.01)

(58) Field of Classification Search
CPC ............ G02B 5/30–3091; G02B 6/272; G02B 6/2773; G02B 27/28–288; H04B 10/532; H04B 10/2569; H04B 14/008; H04J 14/06; B32B 15/01–018
USPC ......... 359/485.04, 489.07; 396/65, 152, 184, 396/205, 206
See application file for complete search history.

(56) References Cited

U.S. PATENT DOCUMENTS

| | | | |
|---|---|---|---|
| 2002/0071188 A1 | 6/2002 | Aoki et al. | |
| 2007/0096852 A1* | 5/2007 | Lawrence | ........ G06K 19/07771 333/195 |
| 2016/0238790 A1* | 8/2016 | Chen | ..................... G02B 6/4208 |
| 2017/0299813 A1 | 10/2017 | Hara et al. | |
| 2019/0113684 A1 | 4/2019 | Tokutaka et al. | |

FOREIGN PATENT DOCUMENTS

| JP | 2002148499 A | 5/2002 |
|---|---|---|
| JP | 2017181862 A | 10/2017 |

* cited by examiner

*Primary Examiner* — Ryan S Dunning
(74) *Attorney, Agent, or Firm* — IpHorgan Ltd.

(57) ABSTRACT

A positioning member for positioning optical components includes a laminated body in which a plurality of thin metal plates is laminated. In the positioning member for positioning the optical components by an upper surface of a first plate forming the laminated body and a side surface of a second plate disposed above the first plate, a portion where two non-parallel side surfaces of the second plate for positioning the optical components cross each other includes a cutout portion including a crossing portion of the side surfaces.

6 Claims, 3 Drawing Sheets

POSITIONING MEMBER HAVING CUTOUT PORTION AND POLARIZATION BEAM COMBINING MODULE USING POSITIONING MEMBER

BACKGROUND OF THE INVENTION

Field of the Invention

The present invention relates to a positioning member and a polarization beam combining module using the positioning member, and in particular to a positioning member for positioning optical components and a polarization beam combining module in which a plurality of optical components used for polarization beam combining are disposed on the positioning member.

Description of Related Art

In the optical communication field or the optical measurement field, a polarization beam combining module that combines a plurality of light waves so as to have different planes of polarization is used. In such a polarization beam combining module, in order to form a space optical system with a plurality of optical components, all the optical components are fixed and disposed on one positioning member.

In a polarization beam combining module in the related art, as disclosed in Japanese Laid-open Patent Publication No. 2016-212127, in the case of disposing one half-wavelength plate and one polarization beam splitter (PBS) in combination, a protruding member is disposed on a base plate, and the half-wavelength plate and the PBS are disposed opposite to each other with the protruding member interposed between the half-wavelength plate and the PBS.

In recent years, an optical modulator using a plurality of different wavelengths has also been proposed. For example, a dual wavelength type optical modulator with a modulation speed of 400 Gbps has also been proposed. In such a broadband modulator, a configuration in which two polarization beam combining optical systems are disposed in parallel is adopted. For the wavelength plate (crystal), the polarization beam combiner element (PBC), and the beam shifter that form each polarization beam combining optical system, it is necessary to perform accurate positioning with respect to not only the relationship between positions or angles of each other but also the relationship between positions or angles with other optical components.

By using the technique disclosed in Japanese Laid-open Patent Publication No. 2016-212127, the parallelism at the time of mounting the wavelength plate and the PBC can be accurately determined. However, positioning in a direction perpendicular to the optical axis is difficult. In addition, it is difficult to accurately perform positioning (including angle determination) of many optical components including a beam shifter.

On the other hand, as a positioning member, one using a laminated body in which a plurality of thin metal plates are laminated has been proposed. The thin metal plate is a metal plate such as JIS-SUS304 having a thickness of about 0.1 to 1 mm, and it is possible to form a metal plate having a free pattern shape by using a pattern formed with a photoresist and an etching technique.

By laminating a plurality of metal plates having different patterns and pressing and heating the entire laminated body, it is possible to integrate the entire laminated body. By using the upper surface of each metal plate or the side surface of the metal plate, it is possible to form a positioning member capable of positioning optical components on the laminated body.

In the case of performing the positioning of the optical components using the side surface of the metal plate, it is necessary to perform the positioning using at least two side surfaces that are not parallel. However, the shape of a portion where the two side surfaces cross each other is not a sharp shape such as in the case of crossing of two straight lines in a plan view, and is likely to be a rounded shape due to the influence of etching.

In contrast, an optical component formed of a crystalline material, such as crystal or quartz, has a sharp corner portion. In a case where the optical component is disposed in a positioning member using the above-described metal plate, the corner portion of the optical component comes into contact with a portion where the two side surfaces cross each other. As a result, a phenomenon called "float" or "tilt" occurs in which the optical component is separated from the side surface of the plate, which makes accurate positioning difficult.

SUMMARY OF THE INVENTION

In order to solve the aforementioned problem, it is an object of the invention to provide a positioning member capable of accurately positioning a plurality of optical components. In addition, it is an object of the invention to provide a polarization beam combining module including a highly accurate space optical system by accurately positioning a plurality of optical components using the positioning member.

In order to solve the aforementioned problem, a positioning member or a polarization beam combining module using the positioning member of the invention has the following technical features.

(1) A positioning member for positioning optical components includes a laminated body in which a plurality of thin metal plates is laminated. In the positioning member for positioning the optical components by an upper surface of a first plate forming the laminated body and a side surface of a second plate disposed above the first plate, a portion where two non-parallel side surfaces of the second plate for positioning the optical components cross each other includes a cutout portion including a crossing portion of the side surfaces.

(2) A polarization beam combining module that combines a plurality of light waves having different planes of polarization includes the positioning member described in the above-described (1); and a plurality of optical components used for polarization beam combining. All of the optical components are disposed on the one positioning member.

(3) In the polarization beam combining module described in the above-described (2), polarization beam combining is performed for each of a plurality of light waves having different wavelengths.

(4) The polarization beam combining module described in the above-described (2) further includes a housing in which the optical components are housed. A step having at least two non-parallel side surfaces is provided on a bottom surface of the housing. A step portion where the two side surfaces cross each other has a cutout portion including a crossing portion of the side surfaces, and the positioning member is disposed so as to be in contact with the two side surfaces.

(5) In the polarization beam combining module described in the above-described (2), the second plate has a side surface for positioning a plurality of optical components.

According to the invention, a positioning member for positioning optical components includes a laminated body in which a plurality of thin metal plates is laminated. In the positioning member for positioning the optical components by the upper surface of a specific plate A forming the laminated body and a side surface of another plate B disposed above the first plate A, a portion where two non-parallel side surfaces of the plate B for positioning the optical components cross each other includes a cutout portion including a crossing portion of the side surfaces. Therefore, since a corner portion of the optical component enters the recessed cutout portion, there is no "float" or "tilt", such as separation of the optical component from the side surface of the plate B. Therefore, it is possible to provide a positioning member allowing a plurality of optical components to be accurately disposed on the positioning member.

In addition, since a plurality of optical components used for polarization beam combining can be accurately positioned by configuring the polarization beam combining module using the positioning member described above, it is possible to provide the polarization beam combining module including a highly accurate space optical system.

DETAILED DESCRIPTION OF THE INVENTION

Hereinafter, a positioning member and a polarization beam combining module using the positioning member of the invention will be described in detail using preferred examples.

First, an example of the polarization beam combining module to which the invention is applied will be described with reference to FIG. 1.

Figure 1:
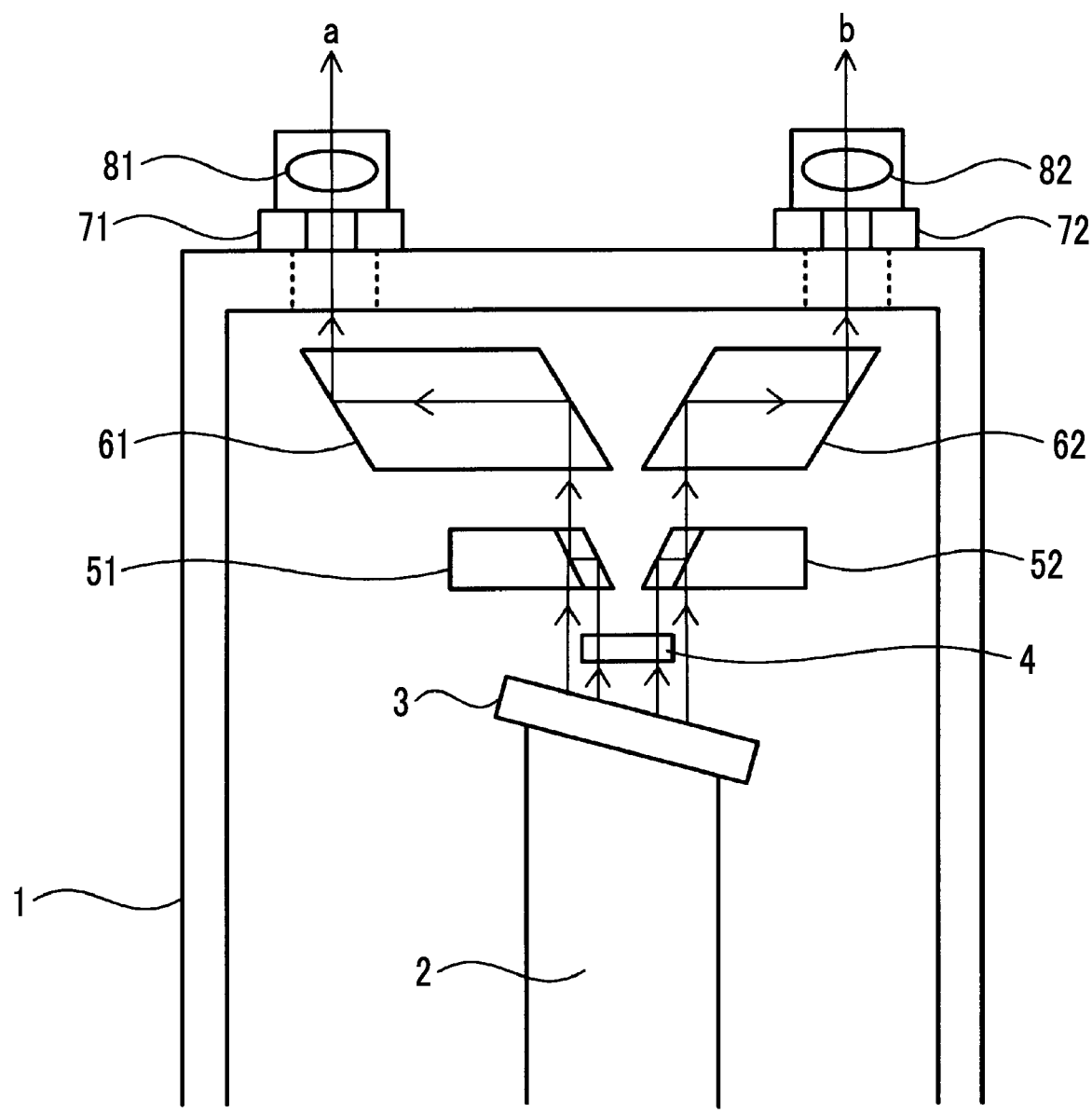
FIG. 1 is a schematic diagram showing an example of a polarization beam combining module to which the invention is applied.

FIG. 1 shows an optical system for combining four signal light beams output from an optical modulation element 2 for each wavelength and outputting polarization-combined light beams a and b having two wavelengths.

The four signal light beams output from the optical modulation element 2 become parallel light beams by a lens array 3 in which four lenses are disposed. The plane of polarization of the two signal light beams on the center side is rotated about 90° by a wavelength plate 4. 51 and 52 are polarization beam combiner elements (PBC), and the signal light passing through the wavelength plate 4 and the signal light not passing through the wavelength plate 4 are combined into one light beam. The polarization-combined signal light passes through beam shifters 61 and 62 to be guided to the outside of a housing 1. A through-hole through which signal light passes is provided in the housing 1, and beams are formed by collimator lenses 81 and 82 held on the housing 1 by pedestals 71 and 72 and are introduced into an optical fiber and the like (not shown).

Figure 2:
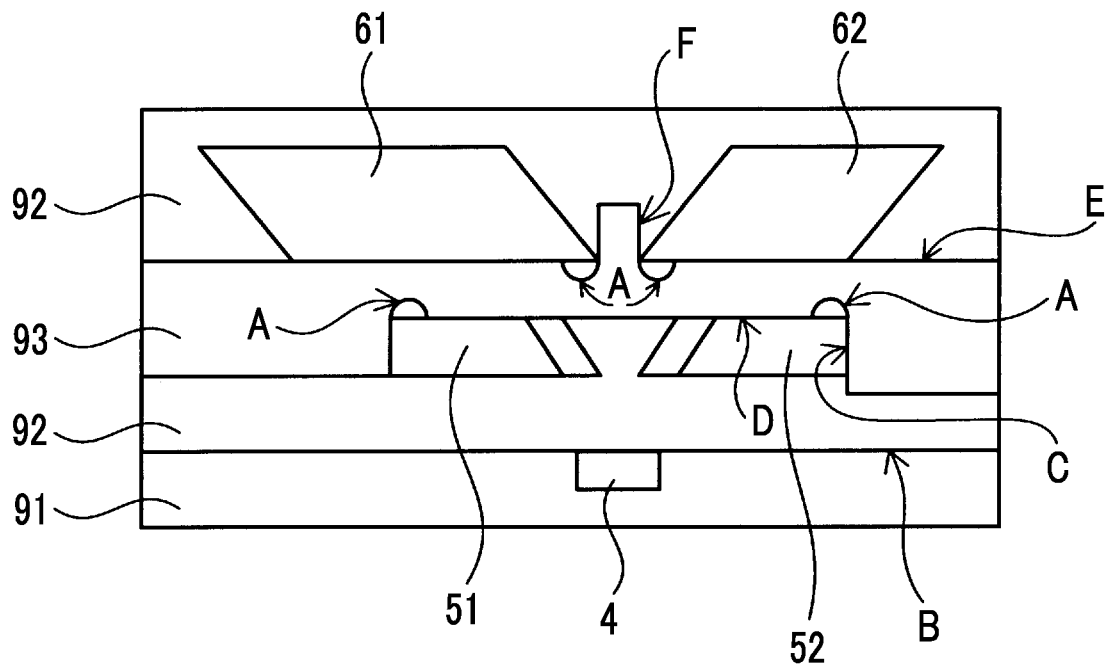
FIG. 2 is a plan view showing optical components disposed on a positioning member of the invention.
Figure 3:
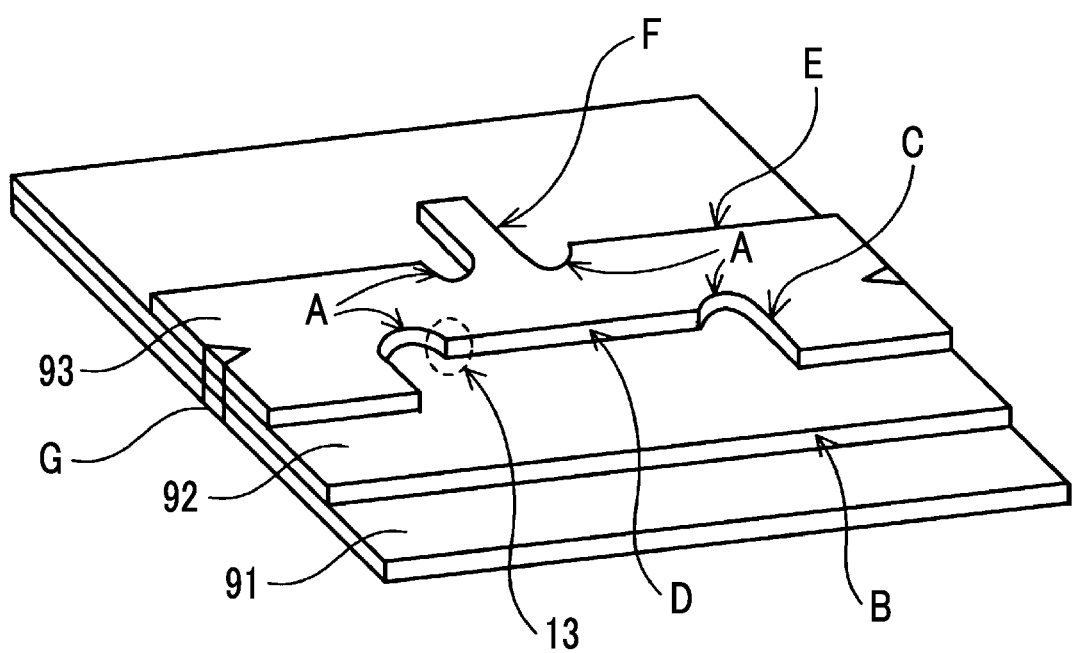
FIG. 3 is a perspective view showing an example of the positioning member of the invention.

As shown in FIGS. 2 and 3, the positioning member of the invention is a positioning member for positioning the wavelength plate 4, the polarization beam combiner elements 51 and 52, the beam shifters 61 and 62 that are optical components, and includes a laminated body in which a plurality of thin metal plates 91 to 93 are laminated. In a positioning member for positioning the optical components by the upper surface of a first plate (for example, 92) forming the laminated body and the side surface of a second plate (for example, 93) disposed above the first plate, a portion where the two non-parallel side surfaces (for example, D and C and E and F) of the second plate for positioning the optical components cross each other includes a cutout portion A including the crossing portion.

As shown in FIG. 3, the positioning member is formed by laminating the thin metal plates 91 to 93, such as JIS-SUS304, and the thickness of each thin metal plate is about 0.1 to 1 mm. Although three metal plates are laminated in FIG. 3, the invention is not limited to this. The metal plate of each layer can have any shape by etching using a photoresist or the like.

A plurality of thin metal plates 91 to 93 are laminated and are bonded to each other by pressing and heating so as to be integrated. It is also possible to provide a positioning mark indicated by reference numeral G at the time of lamination or firmly bond the side surfaces (for example, the position of the reference numeral G) of the laminated metal plates by welding or the like.

In addition, in a case where the optical component is large, instead of using one metal plate forming the side surface, a plurality of metal plates having the same pattern may be superimposed and all of the plurality of metal plates may be pressed and heated to form the side surface. In this case, since it is possible to increase the area of the side surface, the positioning of the optical components becomes easy and the positional accuracy can be improved.

For example, in a case where the metal plate 91 is the first plate and the metal plate 92 is the second plate, each optical component is positioned using the upper surface of the metal plate 91 as the first plate and a side surface B of the metal plate 92 as the second plate. In addition, in a case where the metal plate 92 is the first plate and the metal plate 93 is the second plate, each optical component is positioned using the upper surface of the metal plate 92 as the first plate and side surfaces C, D, E, and F of the metal plate 93 as the second plate. It is needless to say that the metal plate 91 can be set as the first plate and the metal plate 93 can be set as the second plate.

One of the features of the invention is that, for two side surfaces of the second plate used for positioning, for example, the side surfaces C and D of the metal plate 93 or the side surfaces E and F of the same metal plate, a portion where the side surfaces extend to cross each other includes the recessed cutout portion A including the crossing portion. The shape of the cutout portion A is not limited to the rounded shape of a U shape shown in FIGS. 2 and 3, and may be, for example, a rectangular shape indicated by reference numeral K in FIG. 5 or the like. However, in the case of a combination of linear shapes such as a rectangular shape, roundness is likely to occur at the corner, which is an intersection point between straight lines, at the time of forming a metal plate. Therefore, forming the rounded shape of a U shape in advance is advantageous in that more accurate formation is possible.

In particular, in a case where a U-shaped cutout portion is provided on only one (in this case, the side surface D) of the side surfaces C and D as shown in FIG. 3, the length or the area of contact between the other side surface (side surface C) and the optical component is increased. Therefore, it is possible to fix the optical component more stably and accurately.

In addition, in a corner portion 13 formed by the side surface D and the cutout portion A in FIG. 3, deformation due to processing or handling is likely to occur. Since such deformation is a factor of lowering the positioning accuracy of the optical component, it is preferable that the angle of the corner portion is 90° or more in a plan view. Alternatively, the corner portion may be formed to have a curvature instead of an angle.

In addition, since the side surface of the positioning member has many linear portions, the U-shaped cutout portion is more conspicuous. Therefore, the working efficiency of the optical component mounting operation is high. For example, at the time of mounting an optical component, positioning can be simply performed by finding a U-shaped portion and disposing the optical component so that the corner portion of the optical component is located at the U-shaped portion.

FIG. 2 shows a state (plan view) in which optical components used in the polarization beam combining module shown in FIG. 1 are disposed on the positioning member in FIG. 3. The wavelength plate 4 is positioned by the upper surface of the metal plate 91 and the side surface B of the metal plate 92. It is needless to say that it is also possible to adopt positioning using two side surfaces similarly to PBC positioning to be described later.

The PBCs 51 and 52 are positioned by the upper surface of the metal plate 92 and the side surfaces C and D of the metal plate 93. In addition, the beam shifters 61 and 62 are positioned by the upper surface of the metal plate 92 and the side surfaces E and F of the metal plate 93. The optical component disposed on the positioning member is fixed to each metal plate with an adhesive (not shown) or the like.

Figure 4:
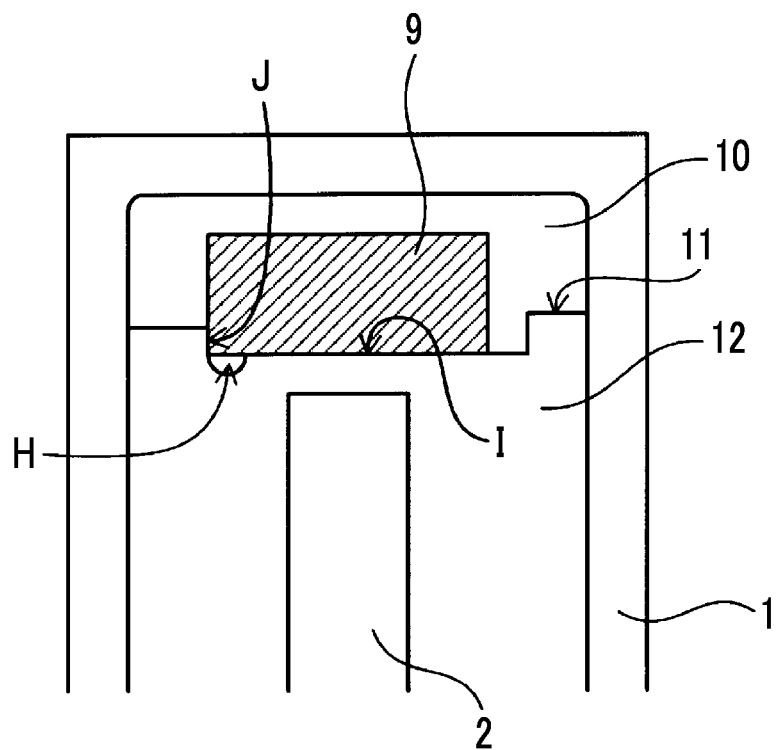
FIG. 4 is a plan view showing apart of a polarization beam combining module including the positioning member of the invention.

Next, a method of disposing optical components, which are disposed on the positioning member as shown in FIG. 2, at predetermined positions in the housing 1 as shown in FIG. 4 will be described.

The positioning member on which the optical members are placed is indicated by reference numeral 9. On the inner bottom surface of the housing 1, a step 11 is formed between a portion 12 where the optical modulation element 2 and the like are disposed and a portion 10 where the positioning member 9 is disposed.

Positioning of the positioning member 9 in the housing 1 is performed by bringing the positioning member 9 into contact with at least two non-parallel side surfaces I and J on which the step 11 is provided. Also in this case, as in FIGS. 2 and 3, it is preferable that, in a step portion where the two side surfaces I and J cross each other, a cutout portion H including a crossing portion is provided.

Figure 5:
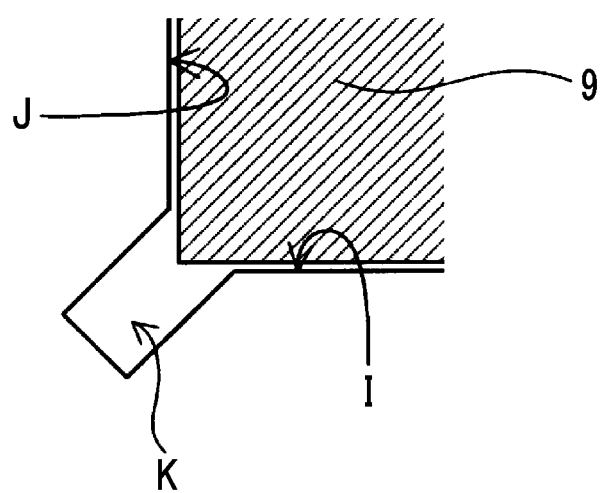
FIG. 5 is a diagram for explaining another shape of a recessed cutout portion.

As shown in FIG. 5, as the shape of the cutout portion H, it is also possible to adopt a configuration, such as a rectangular shape K from two side surfaces I and J. However, since the inner surface of the housing 1 is formed in a cutting method using a cutting machine, it is easier to form the U-shaped recess portion shown in FIG. 4 than the rectangular recess portion.

In addition, in a case where a U-shaped cutout portion is provided on only one (in this case, the side surface I) of the side surfaces I and J as shown in FIG. 4, the length or the area of contact between the other side surface (side surface J) and the optical component is increased. Therefore, it is possible to fix the optical component more stably and accurately.

In a corner portion formed by the side surface I and the cutout portion H in FIG. 4, deformation due to processing or handling is likely to occur. Since such deformation is a factor of lowering the positioning accuracy of the optical component, it is preferable that the angle of the corner portion is 90° or more in a plan view. Alternatively, the corner portion may be formed to have a curvature instead of an angle.

As described above, according to the invention, it is possible to provide a positioning member capable of accurately positioning a plurality of optical components. In addition, since a plurality of optical components can be accurately positioned using the positioning member, it is possible to provide a polarization beam combining module including a highly accurate space optical system.

What is claimed is:

1. A positioning member for positioning optical components, comprising:
   a laminated body in which a plurality of thin metal plates is laminated,
   wherein positioning the optical components is performed by an upper surface of a first plate forming the laminated body and a side surface of a second plate disposed on the first plate wherein the optical components contact the upper surface of the first plate and the side surface of the second plate, and
   in a corner portion which is formed by two non-parallel side surfaces of the second plate for positioning the optical components, a cutout portion including the corner portion is provided on only one of the two non-parallel side surfaces.

2. The positioning member according to claim 1, wherein another corner portion, which is formed by the side surface having the cutout portion, has a curvature.

3. The positioning member according to claim 1, wherein the cutout portion is U-shaped.

4. A polarization beam combining module that combines a plurality of light waves having different planes of polarization, comprising:
   the positioning member according to claim 1; and
   the plurality of optical components, wherein said optical components are used for polarization beam combining and all of the optical components are disposed on the one positioning member.

5. The polarization beam combining module according to claim 4, wherein polarization beam combining is performed for each of a plurality of light waves having different wavelengths.

6. The polarization beam combining module according to claim 4, further comprising:
   a housing in which the optical components are housed,
   wherein a step having at least two non-parallel side surfaces is provided on a bottom surface of the housing,
   a corner portion of the step which is formed by the two side surfaces has a cutout portion including the corner portion, and
   the positioning member is disposed so as to be in contact with the two side surfaces.

* * * * *